US012253227B2

(12) United States Patent
Lin

(10) Patent No.: US 12,253,227 B2
(45) Date of Patent: Mar. 18, 2025

(54) DECORATIVE LAMP STRING AND METHOD FOR MANUFACTURING SAME

(71) Applicant: Yakang Qu, Wenling (CN)

(72) Inventor: Encai Lin, Taizhou (CN)

( * ) Notice: Subject to any disclaimer, the term of this patent is extended or adjusted under 35 U.S.C. 154(b) by 0 days.

(21) Appl. No.: 18/738,688

(22) Filed: Jun. 10, 2024

(65) Prior Publication Data

US 2024/0353075 A1 Oct. 24, 2024

Related U.S. Application Data

(63) Continuation-in-part of application No. 17/567,053, filed on Dec. 31, 2021, now Pat. No. 12,072,072.

(51) Int. Cl.

| | |
|---|---|
| ***F21S 4/10*** | (2016.01) |
| ***F21V 23/04*** | (2006.01) |
| ***F21V 23/06*** | (2006.01) |
| *F21Y 113/00* | (2016.01) |
| *F21Y 115/10* | (2016.01) |

(52) U.S. Cl.

CPC ................ *F21S 4/10* (2016.01); *F21V 23/04* (2013.01); *F21V 23/06* (2013.01); *F21Y 2113/00* (2013.01); *F21Y 2115/10* (2016.08)

(58) Field of Classification Search

CPC ...... F21Y 2107/70; F21S 4/02–26; F21S 4/15

See application file for complete search history.

(56) References Cited

U.S. PATENT DOCUMENTS

2005/0195608 A1* 9/2005 Wu ........................... F21S 4/22 362/249.06

2012/0326634 A1* 12/2012 Li ........................... H05B 47/18 315/312

FOREIGN PATENT DOCUMENTS

FR 2769073 A1 * 4/1999 ................ F21S 4/26

JP 2002025318 A * 1/2002 ................ F21S 4/26

OTHER PUBLICATIONS

Innovation q+ npl search (Year: 2004).*

* cited by examiner

*Primary Examiner* — Anabel Ton

(57) ABSTRACT

A decorative lamp string includes a lamp string and a wool supporting strip. The lamp string is provided with a plurality of lamps, and a wire is arranged between two adjacent lamps. The lamp string is connected to the wool supporting strip. The wool supporting strip includes a supporting portion and a lint portion. The lint portion is arranged around the supporting portion. At least part of the lamp string is embedded in the lint portion. The present disclosure further provides a method for manufacturing a decorative lamp string. By the arrangement of the above structure, the lamp string is connected to the wool supporting strip so that the product is more stable in structure and is easier to be shaped, making it convenient for a user to prepare various shapes with the lamp string.

20 Claims, 10 Drawing Sheets

DECORATIVE LAMP STRING AND METHOD FOR MANUFACTURING SAME

CROSS-REFERENCE TO RELATED APPLICATIONS

This application is a Continuation-in-part Applications of the U.S. application Ser. No. 17/567,053 filed on Dec. 31, 2021, and entitled "DECORATIVE LAMPSTRING AND METHOD FOR MANUFACTURING SAME,".

TECHNICAL FIELD

The present disclosure relates to the technical field of electronic devices, and in particular, to a decorative lamp string and a method for manufacturing the same.

BACKGROUND

With the improvement of the living standard, people have increasingly high requirements for the living environment. In festivals, evening parties, and other scenarios, decorations such as lamp strings, wool supporting strips, sequins, and balloons are usually used to decorate the environment and foil the atmosphere. Due to their diverse shapes and colorful flickering lights, holiday lamp strings have a night lighting decorative effect and is the first choice to add festive atmosphere at festivals. The lamp strings are widely used for decoration in rooms, squares, lawns, trees, and other occasions, and play a good decorative effect.

However, the existing lamp strings usually have bare lamps wound or tied to fixtures, and wires between the lamps are directly exposed. The exposed wires are not aesthetically pleasing themselves and appear obtrusive, affecting the decorative effect.

For this purpose, the present disclosure provides a decorative lamp string and a method for manufacturing the same. A lamp string is combined with a wool supporting strip, which can effectively solve the above problems.

SUMMARY

In order to overcome the shortcomings of the existing lamp strings, the present disclosure provides a decorative lamp string with a simple structure and a good sealing effect.

The technical solution adopted by the present disclosure to solve the technical problem is as follows.

A decorative lamp string, includes:

- a lamp string, wherein the lamp string is provided with a plurality of lamps, and a wire is arranged between two adjacent lamps; and
- a wool supporting strip, wherein the lamp string is connected to the wool supporting strip; the wool supporting strip includes a supporting portion and a lint string portion; the lint string portion is arranged around the supporting portion; and at least part of the lamp string is embedded in the lint string portion.

As an improvement of the present disclosure, the lamp string is spirally wound around the wool supporting strip.

As an improvement of the present disclosure, the decorative lamp string further includes several connectors, wherein the lamp string and the wool supporting strip are arranged side by side; the connectors are connected to the lamp string and the wool supporting strip; and two adjacent connectors are spaced apart from each other.

As an improvement of the present disclosure, a thickness of the lint string portion is greater than or equal to a diameter of the wire.

As an improvement of the present disclosure, the lint string portion includes several lint lines; connecting ends of the lint lines are connected to the supporting portion; and free ends of the lint lines are arranged in a manner of facing away from the supporting portion.

As an improvement of the present disclosure, the wool supporting strip is made of textile fibers.

As an improvement of the present disclosure, the decorative lamp string further includes a connecting head, wherein the connecting head is electrically connected to the lamp string; and the connecting head is configured to connect the lamp string to a power supply.

As an improvement of the present disclosure, the decorative lamp string further includes an adjusting device, wherein the adjusting device is electrically connected to the lamp string; the adjusting device further includes a switching device; and the switching device is configured to switching on or switching off the lamp string.

As an improvement of the present disclosure, the lamp string is a light-emitting diode lamp string.

As an improvement of the present disclosure, a cross-sectional area of the wire is not greater than 0.2 square millimeters.

The present disclosure further provides a method for manufacturing a decorative lamp string. The decorative lamp string includes a lamp string and a wool supporting strip; the lamp string is connected to the wool supporting strip; the lamp string is provided with a plurality of lamps; a wire is arranged between two adjacent lamps; the wool supporting strip includes a supporting portion and a lint string portion; the lint string portion is arranged around the supporting portion; and at least part of the lamp string is embedded in the lint string portion.

As an improvement of the present disclosure, the lamp string is spirally wound around the wool supporting strip.

As an improvement of the present disclosure, the method for manufacturing decorative lamp string further includes: providing several connectors, arranging the lamp string and the wool supporting strip side by side, and using the connectors to be connected to the lamp string and the wool supporting strip, wherein two adjacent connectors are spaced apart from each other.

As an improvement of the present disclosure, a thickness of the lint string portion is greater than or equal to a diameter of the wire.

As an improvement of the present disclosure, the lint string portion includes several lint lines; connecting ends of the lint lines are connected to the supporting portion; and free ends of the lint lines are arranged in a manner of facing away from the supporting portion.

As an improvement of the present disclosure, the wool supporting strip is made of textile fibers.

As an improvement of the present disclosure, a connecting head is electrically connected to the lamp string; and the connecting head is configured to connect the lamp string to a power supply.

As an improvement of the present disclosure, an adjusting device is electrically connected to the lamp string; the adjusting device further includes a switching device; and the switching device is configured to switching on or switching off the lamp string.

As an improvement of the present disclosure, the lamp string is a light-emitting diode lamp string.

As an improvement of the present disclosure, a cross-sectional area of the wire is not greater than 0.2 square millimeters.

The present disclosure has the beneficial effects: By the arrangement of the above structure, the lamp string is connected to the wool supporting strip, and the supporting portion can effectively support the lamp string, so that the product is more stable in structure and is more convenient to shape, making it convenient for a user to make various shapes with the lamp string, such as a deer model and a spider web. Moreover, the supporting portion can support the lamp string to reduce a pressure on all places on the lamp string, prevent the breakage caused by the pressure on the lamp string, and ensure the safety of use of the product. The arrangement of the lint string portion can effectively hide the wires of the lamp string. When the lamp string is connected to the wool supporting strip, part of the lint string portion that is in contact with the lamp string deforms, so that the lamp string can be embedded and hidden in the lint string portion, which can conveniently hide the wires, prevent the wires from being exposed, and make the appearance of the product beautiful; and furthermore, light generated by the lamps irradiate the lint string portion, causing diffuse reflection, which can achieve a better lighting effect.

BRIEF DESCRIPTION OF THE DRAWINGS

In order to explain the technical solutions of the embodiments of the present disclosure more clearly, the following will briefly introduce the accompanying drawings used in the embodiments. The drawings in the following description are only some embodiments of the present disclosure. Those of ordinary skill in the art can obtain other drawings based on these drawings without creative work.

The present disclosure is further described below in detail in combination with the accompanying drawings and embodiments.

DETAILED DESCRIPTION OF THE EMBODIMENTS

Figure 1:
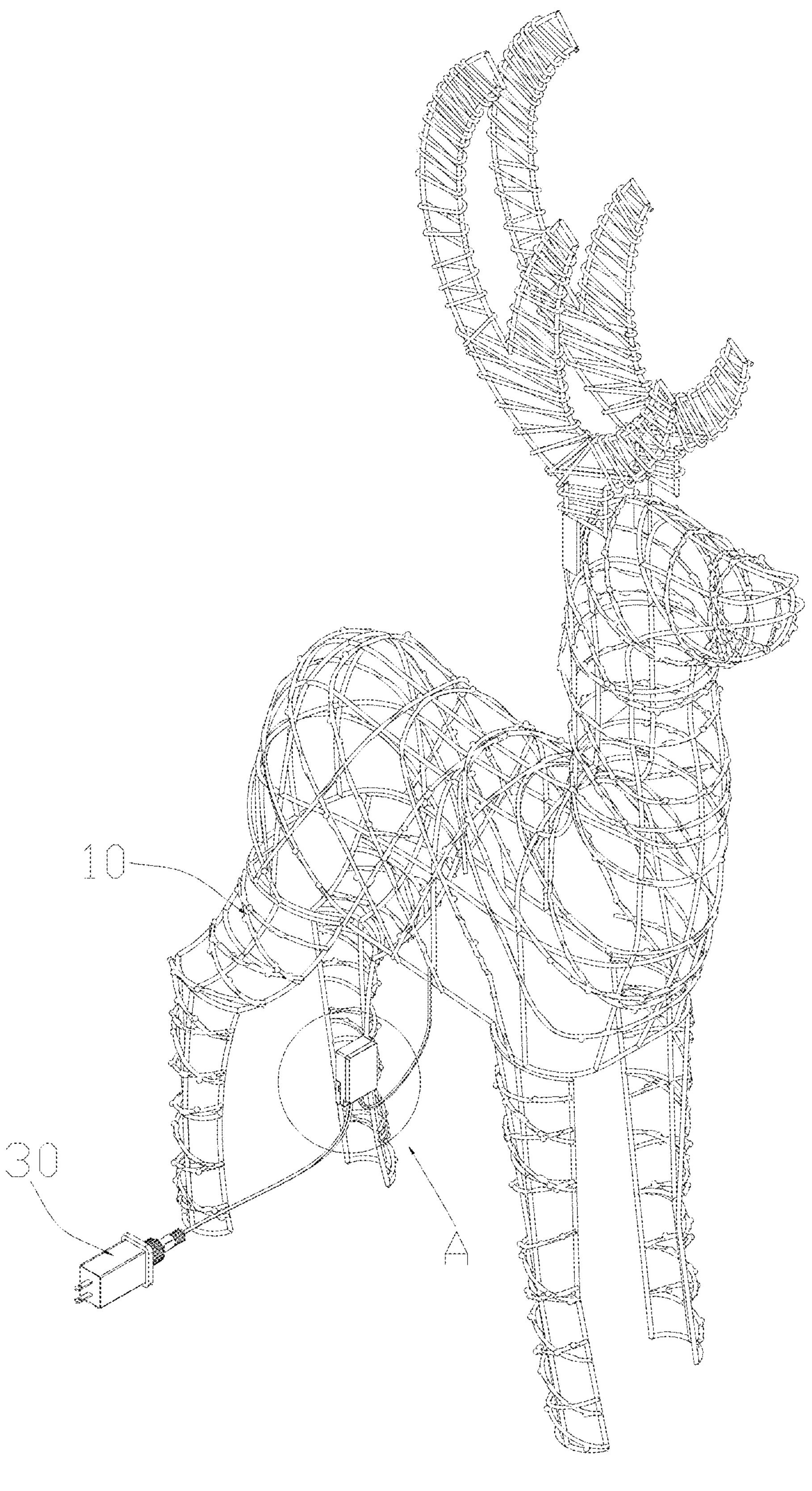
FIG. 1 is a schematic diagram of a first embodiment of the present disclosure.
Figure 2:
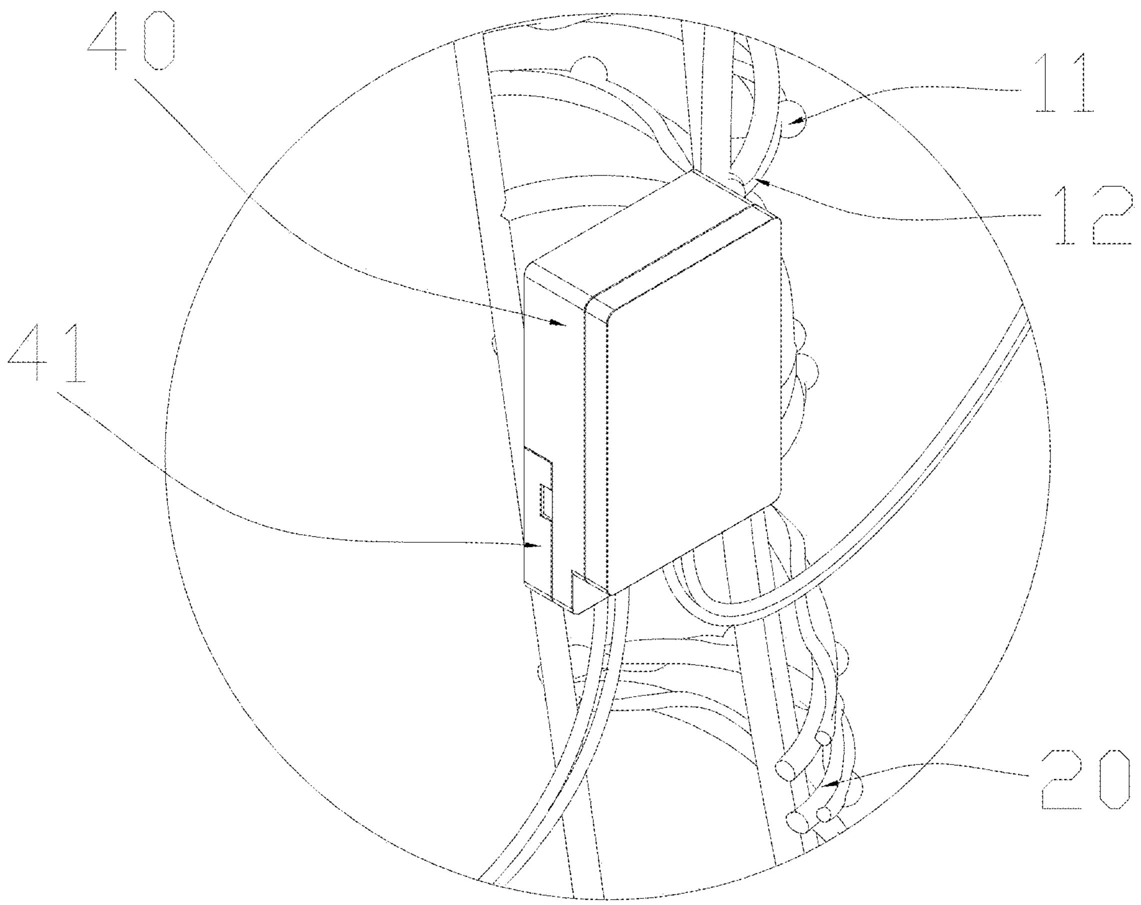
FIG. 2 is an enlarged view of circle A in FIG. 1.
Figure 3:
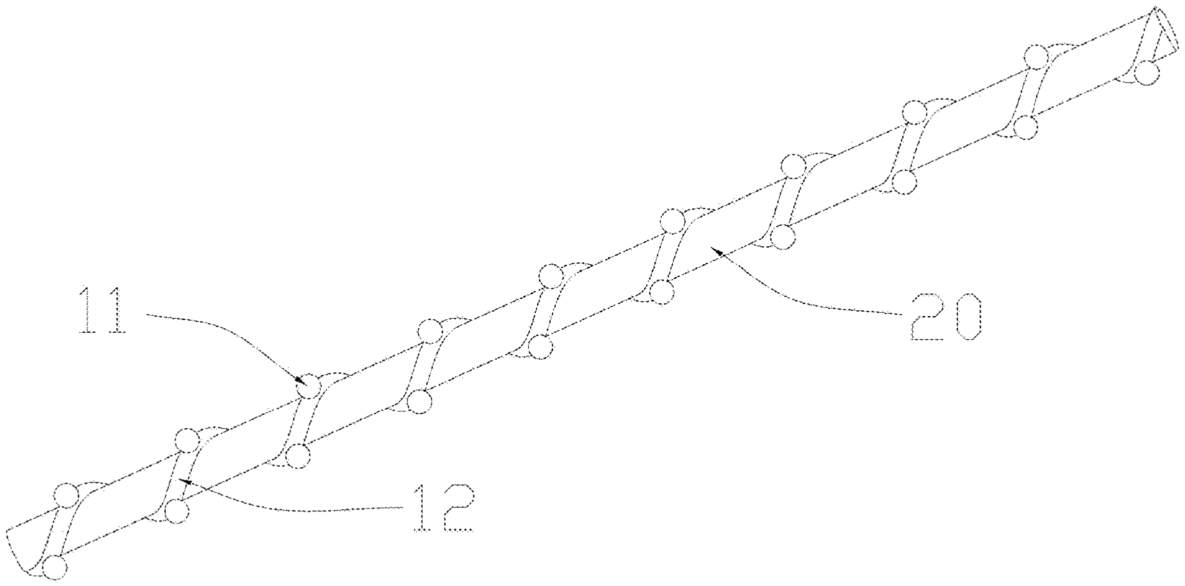
FIG. 3 is a partially schematic structural diagram of a first connecting mode of the present disclosure.
Figure 4:
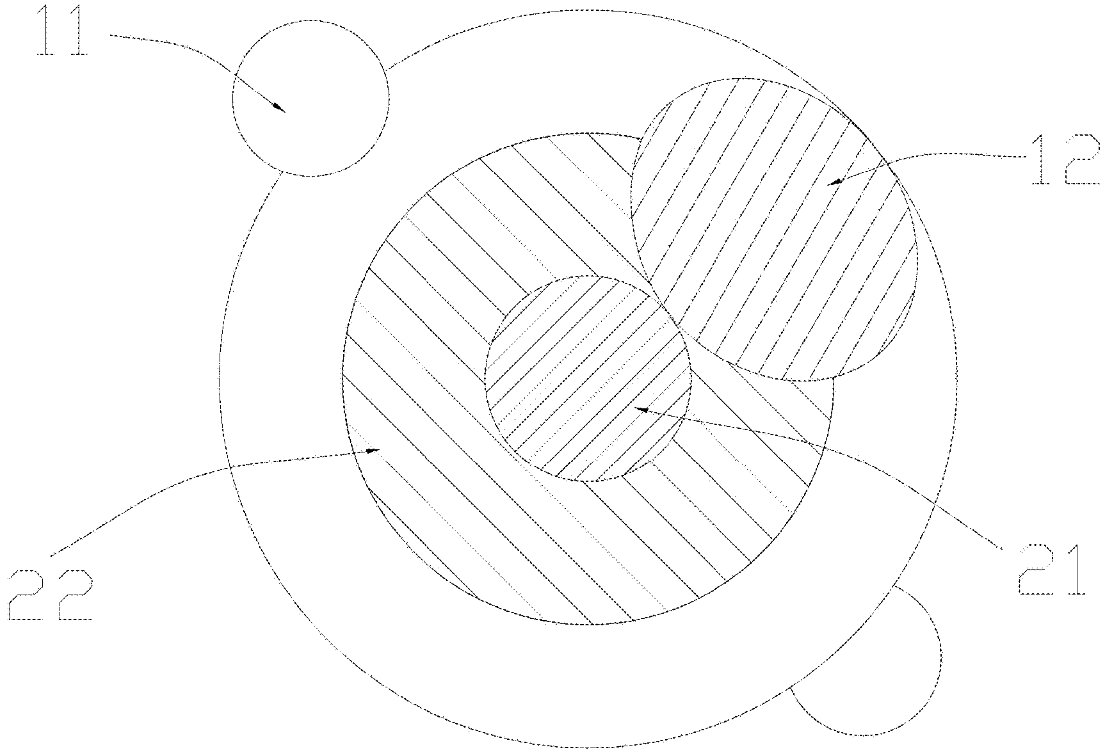
FIG. 4 is a cross-sectional view of a first connecting mode of the present disclosure.
Figure 5:
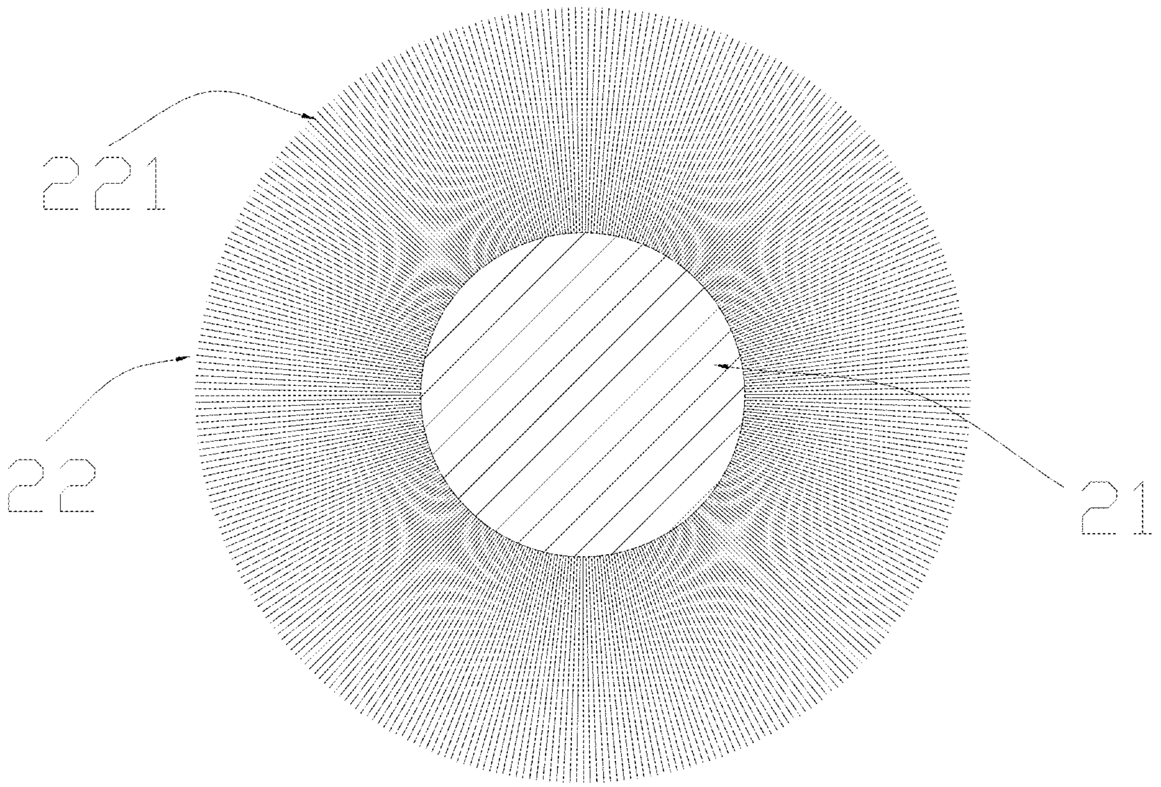
FIG. 5 is a cross-sectional diagram of a wool supporting strip of the present disclosure.
Figure 6:
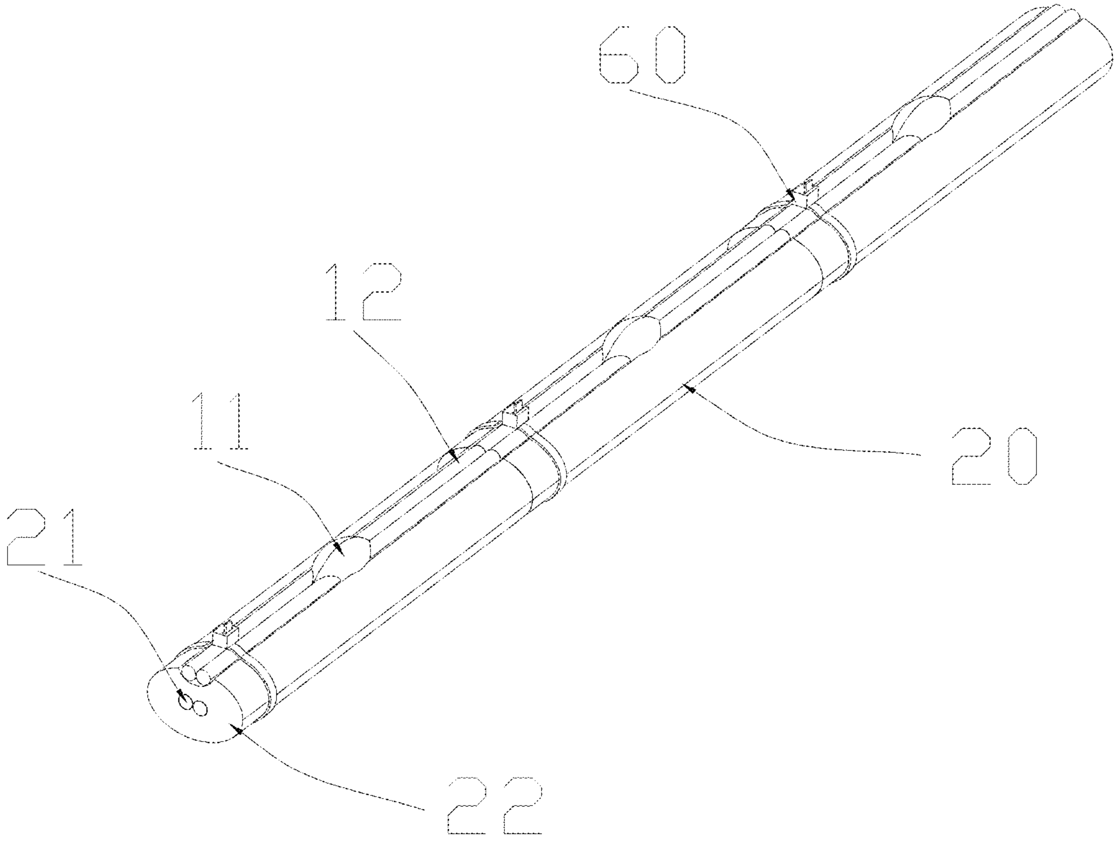
FIG. 6 is a partially schematic structural diagram of a second connecting mode of the present disclosure.
Figure 7:
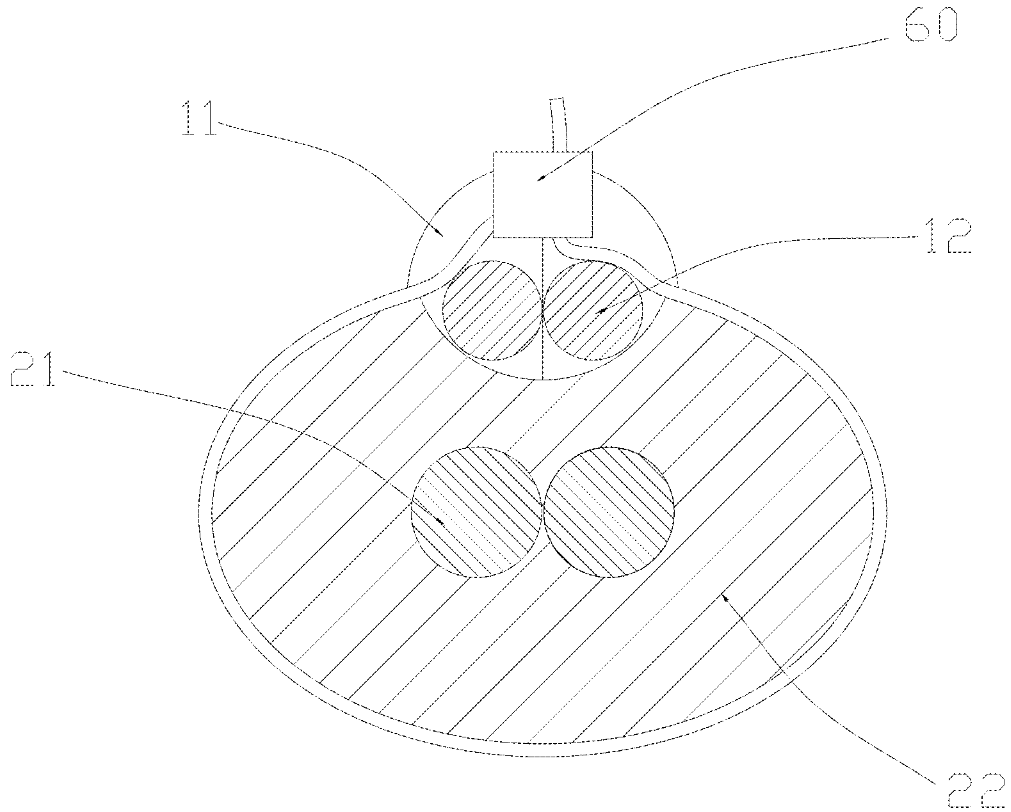
FIG. 7 is a cross-sectional view of a second connecting mode of the present disclosure.
Figure 8:
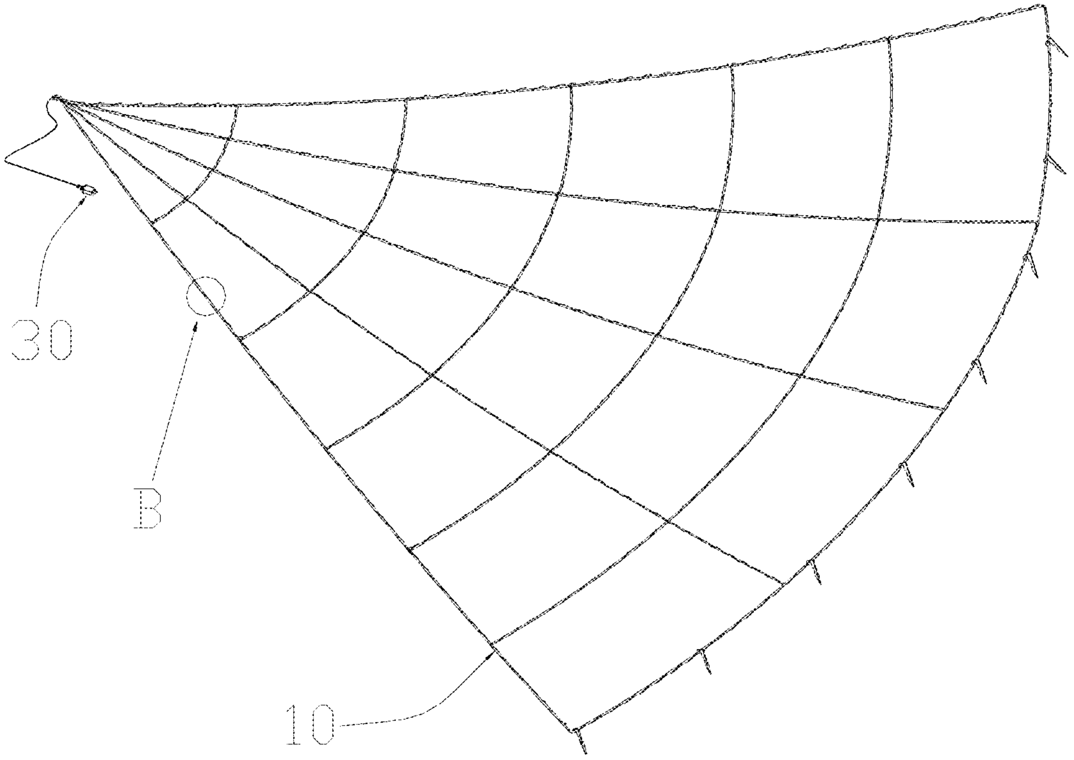
FIG. 8 is a schematic diagram of a second embodiment of the present disclosure.
Figure 9:
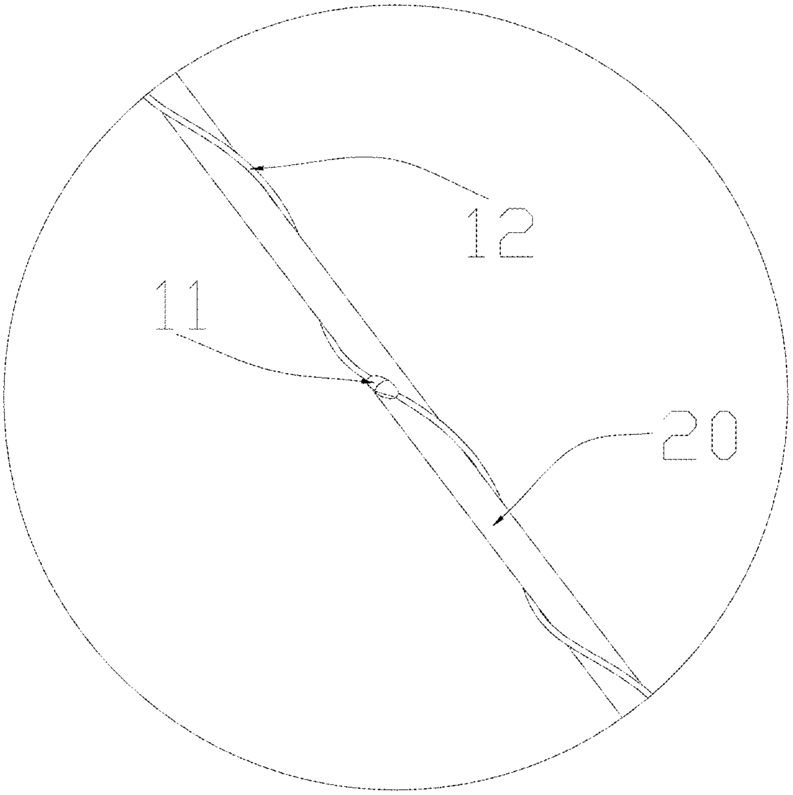
FIG. 9 is an enlarged view of circle B in FIG. 8.
Figure 10:
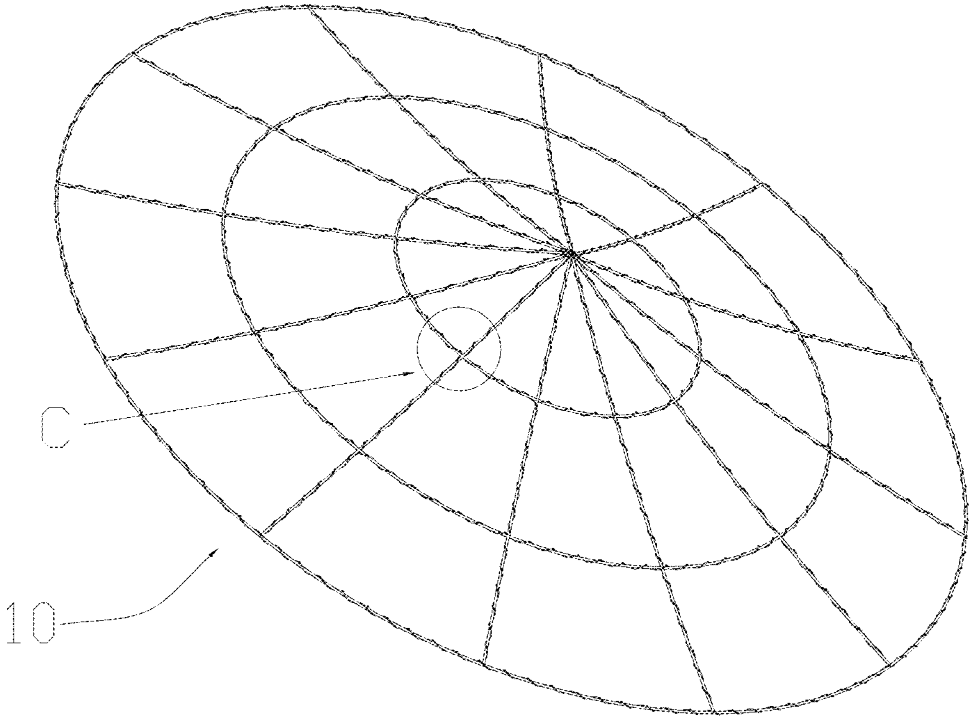
FIG. 10 is a schematic diagram of a third embodiment of the present disclosure.
Figure 11:
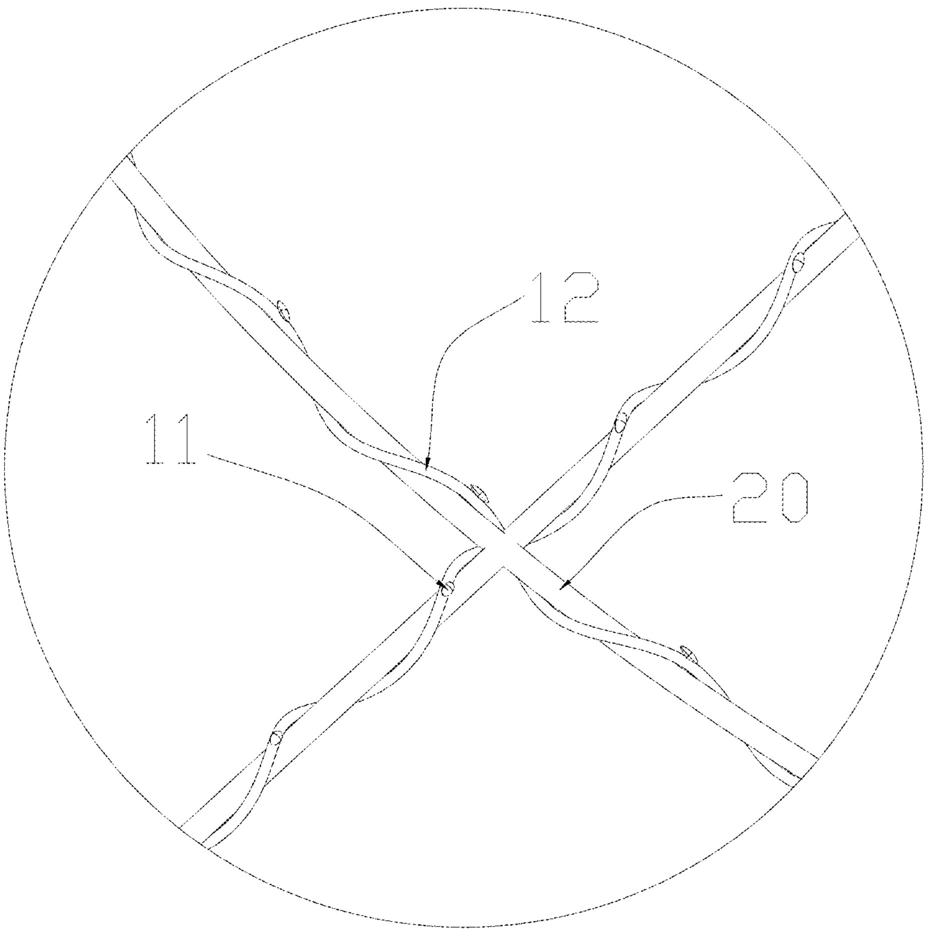
FIG. 11 is an enlarged view of circle C in FIG. 10.

Referring to FIG. 1 to FIG. 11, a decorative lamp string includes:

- a lamp string 10, wherein the lamp string 10 is provided with a plurality of lamps 11, and a wire 12 is arranged between two adjacent lamps 11; and
- a wool supporting strip 20, wherein the lamp string 10 is connected to the wool supporting strip 20; the wool supporting strip 20 includes a supporting portion 21 and a lint string portion 22; the lint string portion 22 is arranged around the supporting portion 21; and at least part of the lamp string 10 is embedded in the lint string portion 22.

By the arrangement of the above structure, the lamp string is connected to the wool supporting strip, and the supporting portion can effectively support the lamp string, so that the product is more stable in structure and is more convenient to shape, making it convenient for a user to make various shapes with the lamp string, such as a deer model and a spider web. Moreover, the supporting portion can support the lamp string to reduce a pressure on all places on the lamp string, prevent the breakage caused by the pressure on the lamp string, and ensure the safety of use of the product. The arrangement of the lint string portion can effectively hide the wires of the lamp string. When the lamp string is connected to the wool supporting strip, part of the lint string portion that is in contact with the lamp string deforms, so that the lamp string can be embedded and hidden in the lint string portion, which can conveniently hide the wires, prevent the wires from being exposed, and make the appearance of the product beautiful; and furthermore, light generated by the lamps irradiate the lint string portion, causing diffuse reflection, which can achieve a better lighting effect.

In this embodiment, the lamp string 10 is spirally wound around the wool supporting strip 20. Spiral winding the lamp string around the wool supporting strip 20 can achieve fast and stable connection between the lamp string 10 and the wool supporting strip 20. The connection mode is simple and stable; the product has high stability; and the production efficiency is high.

In this embodiment, the decorative lamp string further includes several connectors 60; the lamp string 10 and the wool supporting strip 20 are arranged side by side; the connectors 60 are connected to the lamp string 10 and the wool supporting strip 20; and two adjacent connectors 60 are spaced apart from each other. By the arrangement of the above structure, during use, the connectors 60 connect the lamp string 10 to the wool supporting strip 20 together, and the plurality of connectors 60 are spaced apart from each other to ensure that all parts of the lamp string 10 and all parts of the wool supporting strip 20 can be stably connected side by side. Moreover, tying the connectors 60 can also apply a force to the lamp string 10, so that at least part of the lamp string 10 is embedded in the lint string portion 22, which further improves the lighting effect of the product. Preferably, the connectors 60 are tying ribbons. The tying ribbons are fast and stable in connection, and has low cost.

In this embodiment, a thickness of the lint string portion 22 is greater than or equal to a diameter of the wire 12. When the lamp string is spirally wound around the wool supporting strip, the wire of the lamp string can be completely hidden in the lint string portion to prevent the wire from being exposed and ensure the decorative effect of the lamp string.

In this embodiment, the lint string portion 22 includes several lint lines 221; connecting ends of the lint lines 221 are connected to the supporting portion 21; and free ends of the lint lines 221 are arranged in a manner of facing away from the supporting portion 21. By the arrangement of the above structure, the lint lines outwards extend radially from the supporting portion to form the lint string portion. There are small gaps between the lint lines. The light of the lamp string irradiates the lint lines and is reflected between the lint lines, making the lighting effect of the lamp string softer and enhancing the decorative effect of the lamp string.

In this embodiment, the wool supporting strip 20 is made of textile fibers. The wool supporting strip made of the textile fibers are inexpensive and easy to obtain, which greatly reduces the production cost of the product. Preferably, the wool supporting strip is usually made of polyvinyl chloride (PVC), polyethylene (PE), or polypropylene (PP). The PVC, PE, or PP wool supporting strip has high strength, high corrosion resistance, long service life, and low cost.

In this embodiment, the decorative lamp string further includes a connecting head 30, wherein the connecting head 30 is electrically connected to the lamp string 10; and the connecting head 30 is configured to connect the lamp string 10 to a power supply. By the arrangement of the above structure, the connecting head can achieve electrical connection between the lamp string and an external power supply, such as a storage battery and mains supply, ensuring energy supplying of the product, so that the product can continuously emit light, and the battery life of the product is improved.

In this embodiment, the decorative lamp string further includes an adjusting device 40, wherein the adjusting device 40 is electrically connected to the lamp string 10; the adjusting device 40 further includes a switching device 41; and the switching device 41 is configured to switching on or switching off the lamp string 10. The use of the adjusting device can adjust the lighting effect, such as the color, brightness, and flickering effect of the light, so that a user can freely adjust the lighting effect to achieve a more diverse user experience. Moreover, the switching device can conveniently control the switching on or switching off of the lamp string, making it convenient for a user to operate the lamp string. In addition, energy can be saved, and environmental friendliness can be achieved.

In this embodiment, the lamp string 10 is an LED lamp string. By the arrangement of the above structure, LEDs have the characteristics of small volume, long service life, high brightness, and low heat, which can not only ensure the lighting effect, but also achieve the effect of energy conservation, environmental protection, and reduction of energy consumption. Moreover, the LEDs have high flexibility and can be moderately bent, making it convenient for a user to shape the product. The product can be wound into various shapes to further enhance the decorative effect of the product, such as a deer model or a net. Preferably, a copper wire lamp string can be used. The copper wire lamp string has the advantages of low power consumption, high efficiency, long life, rich colors, and high safety, and is convenient to shape.

In this embodiment, a cross-sectional area of the wire 12 is not greater than 0.2 square millimeters. The cross-sectional area of the wire 12 is not greater than 0.2 square millimeters. By the arrangement of the above structure, the cross-sectional area of the wire is not greater than 0.2 square millimeters, so that the wire can be more easily hidden in the lint string portion of the wool supporting strip, and the appearance of the product is attractive. On the other hand, a user can select more kinds of wool supporting strips to improve the applicability of the product.

Referring to FIG. 1 to FIG. 11, a method for manufacturing a decorative lamp string, wherein the decorative lamp string includes a lamp string 10 and a wool supporting strip 20; the lamp string 10 is connected to the wool supporting strip 20; the lamp string 10 is provided with a plurality of lamps 11; a wire 12 is arranged between two adjacent lamps 11; the wool supporting strip 20 includes a supporting portion 21 and a lint string portion 22; the lint string portion 22 is arranged around the supporting portion 21; and at least part of the lamp string 10 is embedded in the lint string portion 22. By the arrangement of the above structure, the lamp string is connected to the wool supporting strip, and the supporting portion can effectively support the lamp string, so that the product is more stable in structure and is more convenient to shape, making it convenient for a user to make various shapes with the lamp string, such as a deer shape and a spider web shape. Moreover, the supporting portion can support the lamp string to: reduce a pressure on all places on the lamp string, prevent the breakage caused by the pressure on the lamp string, and ensure the safety of use of the product. The arrangement of the lint string portion can effectively hide the wires of the lamp string. When the lamp string is connected to the wool supporting strip, part of the lint string portion that is in contact with the lamp string deforms, so that the lamp string can be embedded and hidden in the lint string portion, which can conveniently hide the wires, prevent the wires from being exposed, and make the appearance of the product beautiful; and furthermore, light generated by the lamps irradiate the lint string portion, causing diffuse reflection, which can achieve a better lighting effect.

In this embodiment, the lamp string 10 is spirally wound around the wool supporting strip 20. Spiral winding the lamp string around the wool supporting strip 20 can achieve fast and stable connection between the lamp string 10 and the wool supporting strip 20. The connection mode is simple and stable; the product has high stability; and the production efficiency is high.

In this embodiment, the decorative lamp string further includes several connectors 60; the lamp string 10 and the wool supporting strip 20 are arranged side by side; the connectors 60 are used to be connected to the lamp string 10 and the wool supporting strip 20; and two adjacent connectors 60 are spaced apart from each other. By the arrangement of the above structure, during use, the connectors 60 connect the lamp string 10 to the wool supporting strip 20 together, and the plurality of connectors 60 are spaced apart from each other to ensure that all parts of the lamp string 10 and all parts of the wool supporting strip 20 can be stably connected side by side. Moreover, tying the connectors 60 can also apply a force to the lamp string 10, so that at least part of the lamp string 10 is embedded in the lint string portion 22, which further improves the lighting effect of the product. Preferably, the connectors 60 are tying ribbons. The tying ribbons are fast and stable in connection, and has low cost.

In this embodiment, a thickness of the lint string portion 22 is greater than or equal to a diameter of the wire 12. The thickness of the lint string portion is greater than or equal to the diameter of the wire. When the lamp string is spirally wound around the wool supporting strip, the wire of the lamp string can be completely hidden in the lint string portion to: prevent the wire from being exposed and ensure the decorative effect of the lamp string.

In this embodiment, the lint string portion 22 includes several lint lines 221; connecting ends of the lint lines 221 are connected to the supporting portion 21; and free ends of the lint lines 221 are arranged in a manner of facing away from the supporting portion 21. By the arrangement of the above structure, the lint lines outwards extend radially from the supporting portion to form the lint string portion. There are small gaps between the lint lines. The light of the lamp string irradiates the lint lines and is reflected between the lint lines, making the lighting effect of the lamp string softer and enhancing the decorative effect of the lamp string.

In this embodiment, the lint portion 22 includes several lint lines 221; connecting ends of the lint lines 221 are connected to the supporting portion 21; and free ends of the lint lines 221 are arranged in a manner of facing away from the supporting portion 21. By the arrangement of the above structure, the lint lines outwards extend radially from the supporting portion to form the lint portion. There are small gaps between the lint lines. The light of the lamp string irradiates the lint lines and is reflected between the lint lines, making the lighting effect of the lamp string softer and enhancing the decorative effect of the lamp string.

In this embodiment, the wool supporting strip 20 is made of textile fibers. The wool supporting strip made of the textile fibers are inexpensive and easy to obtain, which greatly reduces the production cost of the product. Preferably, the wool supporting strip is usually made of PVC, PE, or PP. The PVC, PE, or PP wool supporting strip has high strength, high corrosion resistance, long service life, and low cost.

In this embodiment, the method further includes: providing a connecting head 30, wherein the connecting head 30 is electrically connected to the lamp string 10; and the connecting head 30 is configured to connect the lamp string 10 to a power supply. By the arrangement of the above structure, the connecting head can achieve electrical connection between the lamp string and an external power supply, such as a storage battery and mains supply, ensuring energy supplying of the product, so that the product can continuously emit light, and the battery life of the product is improved.

In this embodiment, the method further includes: providing an adjusting device 40, wherein the adjusting device 40 is electrically connected to the lamp string 10; the adjusting device 40 further includes a switching device 41; and the switching device 41 is configured to switching on or switching off the lamp string 10. The use of the adjusting device can adjust the lighting effect, such as the color, brightness, and flickering effect of the light, so that a user can freely adjust the lighting effect to achieve a more diverse user experience. Moreover, the switching device can conveniently control the switching on or switching off of the lamp string, making it convenient for a user to operate the lamp string. In addition, energy can be saved, and environmental friendliness can be achieved.

In this embodiment, the lamp string 10 is an LED lamp string. By the arrangement of the above structure, LEDs have the characteristics of small volume, long service life, high brightness, and low heat, which can not only ensure the lighting effect, but also achieve the effect of energy conservation, environmental protection, and reduction of energy consumption. Moreover, the LEDs have high flexibility and can be moderately bent, making it convenient for a user to shape the product. The product can be wound into various shapes to further enhance the decorative effect of the product, such as a deer shape or a net shape. Preferably, a copper wire lamp string can be used. The copper wire lamp string has the advantages of low power consumption, high efficiency, long life, rich colors, and high safety, and is convenient to shape.

In this embodiment, a cross-sectional area of the wire 12 is not greater than 0.2 square millimeters. The cross-sectional area of the wire 12 is not greater than 0.2 square millimeters. By the arrangement of the above structure, the cross-sectional area of the wire is not greater than 0.2 square millimeters, so that the wire can be more easily hidden in the lint string portion of the wool supporting strip, and the appearance of the product is attractive. On the other hand, a user can select more kinds of wool supporting strips to improve the applicability of the product.

One or more implementation modes are provided above in combination with specific contents, and it is not deemed that the specific implementation of the present disclosure is limited to these specifications. Any technical deductions or replacements approximate or similar to the method and structure of the present disclosure or made under the concept of the present disclosure shall fall within the scope of protection of the present disclosure.

What is claimed is:

1. A decorative lamp string, comprising:
- a lamp string, wherein the lamp string is provided with a plurality of lamps, and a wire is arranged between two adjacent lamps; and
- a wool supporting strip, wherein the lamp string is connected to the wool supporting strip; the wool supporting strip comprises a supporting portion and a lint string portion; the lint string portion is arranged around the supporting portion; part of the lamp string is embedded in the lint string portion, and part of the lamp string is exposed to outside of the lint string portion.

2. The decorative lamp string according to claim 1, wherein the lamp string is spirally wound around the wool supporting strip.

3. The decorative lamp string according to claim 1, further comprising several connectors, wherein the lamp string and the wool supporting strip are arranged side by side; the connectors are connected to the lamp string and the wool supporting strip; and two adjacent connectors are spaced apart from each other.

4. The decorative lamp string according to claim 1, wherein a thickness of the lint string portion is greater than or equal to a diameter of the wire.

5. The decorative lamp string according to claim 1, wherein the lint string portion comprises several lint lines; connecting ends of the lint lines are connected to the supporting portion; and free ends of the lint lines are arranged in a manner of facing away from the supporting portion.

6. The decorative lamp string according to claim 1, wherein the wool supporting strip is made of textile fibers.

7. The decorative lamp string according to claim 1, further comprising a connecting head, wherein the connecting head is electrically connected to the lamp string; and the connecting head is configured to connect the lamp string to a power supply.

8. The decorative lamp string according to claim 1, further comprising an adjusting device, wherein the adjusting device is electrically connected to the lamp string; the adjusting device further comprises a switching device; and the switching device is configured to switching on or switching off the lamp string.

9. The decorative lamp string according to claim 1, wherein the lamp string is a light-emitting diode (LED) lamp string.

10. The decorative lamp string according to claim 1, wherein a cross-sectional area of the wire is not greater than 0.2 square millimeters.

11. A method for manufacturing a decorative lamp string, wherein the decorative lamp string comprises a lamp string and a wool supporting strip; the lamp string is connected to the wool supporting strip; the lamp string is provided with a plurality of lamps; a wire is arranged between two adjacent lamps; the wool supporting strip comprises a supporting portion and a lint string portion; the lint string portion is arranged around the supporting portion; part of the lamp string is embedded in the lint string portion, and part of the lamp string is exposed to outside of the lint string portion.

12. The method for manufacturing the decorative lamp string according to claim 11, wherein the lamp string is spirally wound around the wool supporting strip.

13. The method for manufacturing the decorative lamp string according to claim 11, further comprising: providing several connectors, arranging the lamp string and the wool supporting strip side by side, and using the connectors to be connected to the lamp string and the wool supporting strip, wherein two adjacent connectors are spaced apart from each other.

14. The method for manufacturing the decorative lamp string according to claim 11, wherein a thickness of the lint string portion is greater than or equal to a diameter of the wire.

15. The method for manufacturing decorative lamp string according to claim 11, wherein the lint string portion comprises several lint lines; connecting ends of the lint lines are connected to the supporting portion; and free ends of the lint lines are arranged in a manner of facing away from the supporting portion.

16. The method for manufacturing the decorative lamp string according to claim 11, wherein the wool supporting strip is made of textile fibers.

17. The method for manufacturing the decorative lamp string according to claim 11, wherein a connecting head is electrically connected to the lamp string; and the connecting head is configured to connect the lamp string to a power supply.

18. The method for manufacturing the decorative lamp string according to claim 11, wherein an adjusting device is electrically connected to the lamp string; the adjusting device further comprises a switching device; and the switching device is configured to switching on or switching off the lamp string.

19. The method for manufacturing the decorative lamp string according to claim 11, wherein the lamp string is a light-emitting diode (LED) lamp string.

20. The method for manufacturing the decorative lamp string according to claim 11, wherein a cross-sectional area of the wire is not greater than 0.2 square millimeters.

* * * * *